(12) United States Patent
Johnson et al.

(10) Patent No.: US 6,981,167 B2
(45) Date of Patent: Dec. 27, 2005

(54) PROGRAMMABLE CONTROLLER WITH SUB-PHASE CLOCKING SCHEME

(75) Inventors: Charles Johnson, Gray, TN (US);
Michael Hales, Johnson City, TN (US);
Ronald Harris, Johnson City, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 513 days.

(21) Appl. No.: 10/171,449

(22) Filed: Jun. 13, 2002

(65) Prior Publication Data

US 2002/0198607 A1    Dec. 26, 2002

Related U.S. Application Data

(60) Provisional application No. 60/297,802, filed on Jun. 13, 2001.

(51) Int. Cl.[7] ................ G06F 1/06; H03K 19/00; H03K 19/096

(52) U.S. Cl. .................... 713/500; 326/93; 326/96

(58) Field of Search ................ 716/1, 2, 3, 6; 713/503, 500; 326/93, 96, 95

(56) References Cited

U.S. PATENT DOCUMENTS

| | | | |
|---|---|---|---|
| 5,210,700 A * | 5/1993 | Tom | 716/6 |
| 5,978,571 A * | 11/1999 | Grundmann | 703/23 |
| 6,584,597 B1 * | 6/2003 | Kishinevsky et al. | 716/1 |
| 2002/0091983 A1 * | 7/2002 | Andreev et al. | 716/2 |

* cited by examiner

*Primary Examiner*—Thomas Lee
*Assistant Examiner*—Ji H. Bae

(57) ABSTRACT

A parallel processor with a built-in sub-phase clocking scheme is provided to execute sequentially executed programmable logic controller (PLC) programs in a parallel method. A translator program will translate the PLC logic design from a coding language into Electronic Design Interchange Format and that will be eventually converted to a hardware or software embodiment of the logic. The processor provides a plurality of sub-phase clock periods. The translator assigns to the same sub-phase period program elements that process their tasks in the same range of time. The elements are grouped into sub-phase so that logic elements are performed lock-step to ensure that downstream element are performed at a time when they have valid values at their inputs. The processor consequently avoids race conditions in the system and allows the parallel execution speedup of programs written for a sequential machine such as a PLC.

20 Claims, 3 Drawing Sheets

PROGRAMMABLE CONTROLLER WITH SUB-PHASE CLOCKING SCHEME

This patent application claims priority to the Provisional Patent Application (Ser. No. 60/297,802) filed on Jun. 13, 2001.

FIELD OF THE INVENTION

The invention generally concerns processors that are useful in programming sequential circuits. In particular, the invention concerns a programmable controller with a sub-phase clocking scheme that is useful in the programming of industrial control assemblies, such as programmable logic controllers processing in parallel.

BACKGROUND OF THE INVENTION

In the field of programmable logic controllers (PLCs), PLC processing was initially sequential in design. While effective and useful in supporting conventional industrial control and automation requirements, sequential PLCs do not generally support systems that require high speed automation processing. In response to this deficiency, external modules were developed to augment conventional PLC processing performance. The result is a system that provides parallel processing at speeds which exceed the typical sequential PLC and will support the high speed requirements demanded by current industrial control and automation systems.

PLC developers typically employ the use of certain circuit modeling programs to simulate the execution of a PLC program prior to imbedding the program within a PLC or within an external module that is in communication with the PLC. The circuit modeling programs are based upon the use of conventional ladder logic. It will be appreciated that FIG. 1 shows a conventional ladder logic diagram (using relay representation) for programming a PLC. A power conductor 5 is connected to input components 7 that are connected in series to an output component 10. One of ordinary skill in the art will understand that conventional ladder logic progresses sequentially from input to input and finally to output. The output component is then connected to a return path 14. The resultant ladder logic is converted into the discrete components that form the PLC. One of ordinary skill in the art will understand that since conventional ladder logic progresses sequentially it is extremely difficult and problematic to simulate the parallel processing provided by external modules that augment sequential PLCs.

FIGS. 2A and 2B show examples of conventional programming devices that a user may employ to program a PLC. FIG. 2A shows a dedicated device 17 that may be attached directly to the programming port of a PLC 20. Alternatively, a user may employ a standard personal computer 23 containing the appropriate software and connections 27 to program the PLC 20.

FIG. 3 provides a basic flow diagram 30 of the conventional method for programming a parallel execution PLC. In step 31 the PLC program is developed by the user utilizing program entry tools. The result is the program represented in a coding language, such as MC7, a Siemens Energy & Automation brand coding language. In step 32, the program is then simulated to detect logic and functional errors. The user corrects errors by entering changes using the program entry tools. It will be appreciated that during this step the user performs the laborious and time consuming task of determining and programming processing delays to account for race conditions that occur in the program. In step 33, the coding language is then compiled by a compiler into a native bit stream for the field programmable gate array (FPGA) and thereafter transferred in step 34 to a PLC. The PLC uses FPGA technology as its hardware engine to execute the instructions contained in the bit stream file.

As provided above, a problem that has often arisen in the circuit modeling and programming of PLCs is known as a race condition. In a sequential machine, such as a PLC, the program must ensure that downstream logic elements receive values at the proper time from upstream logic elements. When the timing is not correct, a race condition will occur. When a race condition exists, results of some logic paths will reach their outputs sooner than other paths. Consequently, the downstream elements might be strobed at a time when some of their inputs are not valid. When a race condition occurs, the program does not work properly and quite often will lead to errors in the output. One or ordinary skill in the art will understand that PLC programming that supports parallel processing generally causes an excessive amount of race conditions.

Conventionally, end users perform the onerous task of determining where the racing conditions exist and insert delays into key spots in the circuit to alleviate the race conditions manually. Users perform this task during the testing and debugging stage of the process. The task, known as alignment, is a tedious and time-consuming process. It would be advantageous to provide a system and method for preventing the occurrence of race conditions when programming PLCs. This system and method would be particularly beneficial for PLCs that are augmented with external modules which result in parallel processing.

SUMMARY OF THE INVENTION

The invention is achieved by a programmable controller having a built-in sub-phase clocking scheme that divides the circuit clock, such as a 1 $\mu$-sec clock, into a plurality of sub-phases. A translator assigns circuit elements that process in the same range of time to the same sub-phase. A processor assigns the circuit elements to particular sub-phases pursuant to software created in the translator program. The lockstep technique of the invention for strobing circuit elements in the same sub-phase, ensures that elements in later sub-phases will have valid results at their inputs when their sub-phase arrives. The processor and its lock-step assignment of circuit elements to appropriate sub-phases thus prevents race conditions from occurring. The invention automatically alleviates race conditions in programming devices for PLCs and therefore eliminates the laborious task of determining and setting delays to counteract race conditions. The invention acts as a sequential machine, yet processes each lock-step, i.e., phase of the circuit, in parallel. Thus allowing a parallel machine to process a program written for a sequential machine in a much reduced time.

The present invention also can accommodate previous generation software written for sequential machines. That is, the present invention is fully reverse compatible with sequential machine software. This is a tremendous advantage to users because previous software can be ported seamlessly to the new invention.

DETAILED DESCRIPTION OF THE INVENTION

The present invention is embodied by a translator program in communication with a parallel processor. The processor of the invention employs a process for multiphase clocking of the logic program into a plurality of sub-phases. As the translator translates the PLC program elements to the hardware elements that will exist in the FPGA, it assigns to the same sub-phase those elements that will carry out its processes in the same range of time. As an example, in most instances memory elements cause substantial processing delays, whereas the delays associated with common logic gates (AND, OR) is negligible. In this case, the translator of the invention will determine which memory units do not depend on previous memory elements and will assign all such memories to a first sub-phase. The translator then assigns to the second sub-phase the next set of memory elements which depend on the memories in the first phase. The translator continues the assignment of circuit elements to appropriate sub-phases for the entire circuit.

The phase clock is generated by dividing the normal clock into a plurality of subphases. In a preferred embodiment, the number of sub-phases is 12. However, one of ordinary skill in the art will understand that 12 sub-phases are merely exemplary and that alternative embodiments of the present invention may include any number of "n." sub-phases. The purpose of the phase clock is to make a parallel machine function like a sequential machine.

Figure 5:
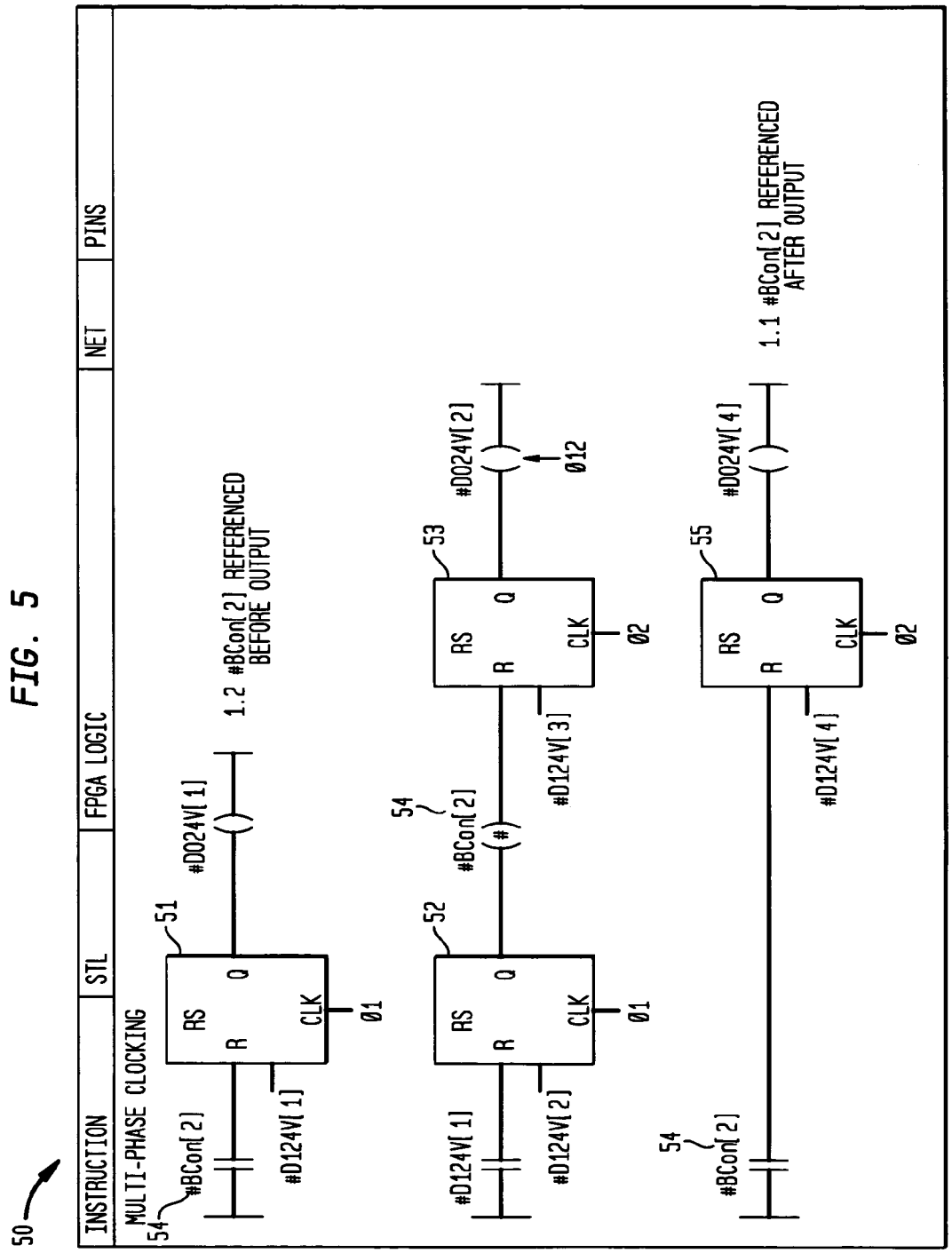
FIG. 5 shows an example of the multi-phase clocking scheme in accordance with the invention.

FIG. 5 shows a diagram 50 of an example multi-phase clocking scheme in accordance with the invention. The memory-retentive instructions, in this case RS flip-flops 51, are each updated with a phase of the multi-phase clock. In the second ladder rung the first flip-flop 52 is updated on clock phase 1 and the second flip-flop 53 is updated on clock phase 2. This ensures that all retentive devices update sequentially on the rung. The mid-line output BCon[2] 54 on the second ladder rung is valid after phase clock 1. Since the third ladder rung references BCon[2] 54 as an input to the flip-flop, the translator sets the RS flip-flop 55 to update on clock phase 2. This ensures that the flip-flop is updated after BCon[2] 54 has been updated and prevents a race condition. In the first ladder rung, in which BCon[2] 54 is referenced before it has been output in ladder rung 2, the value of BCon[2] 54 is used from the previous scan. Therefore, the RS flip-flop 51 on ladder rung 1 is updated on phase clock 1. Even though each ladder rung is running in parallel, this clocking method enables the program to generate the same outputs as a sequential machine. The multi-phase clocking also enables multiple retentive elements on a ladder rung to update in a single scan.

If a program is ported from a sequential machine and loaded to a parallel machine, theoretically, there will be race condition problems. The invention eliminates the tedious task of detecting race conditions and then rewriting the program to account for such conditions.

An advantage of converting programs to a parallel machine (FPGA is one possible implementation) is that resulting products run at significantly faster scan times, typically 1 $\mu$-sec scan as compared to the PLC which typically executes at a scan times on the order of milliseconds.

EXAMPLE

One example of the invention is set forth below:

1. Hardware

An FPGA in the processor module serves as a parallel execution machine. All combinatorial functions are performed in parallel. A multi-phase clocking scheme is utilized within the module to automatically compensate for clocked logic delays. The multi-phase clocking scheme will allow the user to program without concern for delays in different elements of the program. The module has a limited number of 24V input and 24V output points (up to 12 inputs and 8 outputs). The module provides 5V, differential I/O to support differential encoders (SSI and 5V quadrature). There are 3 differential inputs and 1 differential output. The CPU has access to 14 bytes of input and 14 bytes of output to permit transfer of user program control information, count values, counter preset values and other information. Module status and control information are supported with 2 additional bytes of input and output accessible to the CPU. Module programs are stored in a compiled form on a micro memory card that is required for normal module operation. Module programs are executed within an FPGA. Support functions (process alarm handling, diagnostics handling, data passing to and from user data interface and others) will be performed by the microcontroller in the bus interface ASIC.

2. Programming

Figure 1:
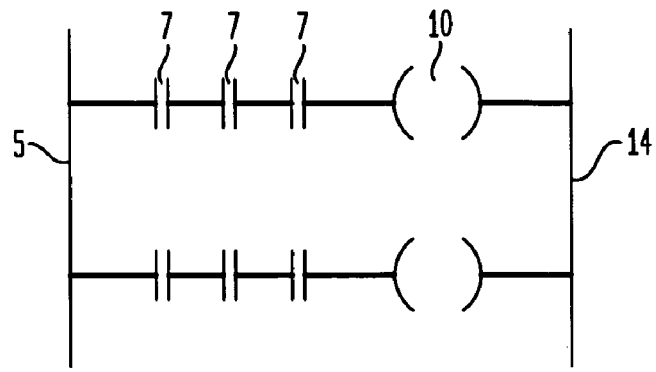
FIG. 1 shows a conventional basic ladder logic diagram used in programming a PLC.
Figure 2A:
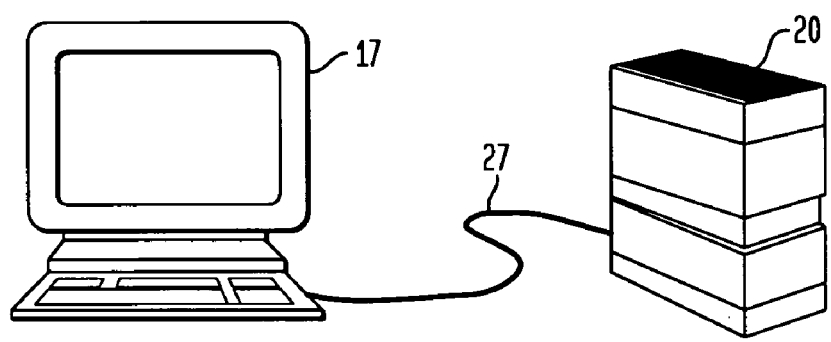
FIG. 2A shows a conventional dedicated programming device for programming a PLC.
Figure 2B:
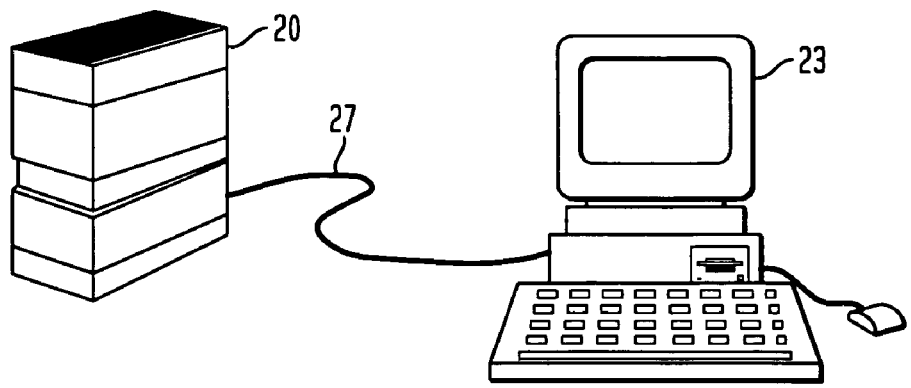
FIG. 2B shows a conventional personal computer device for programming a PLC.
Figure 3:
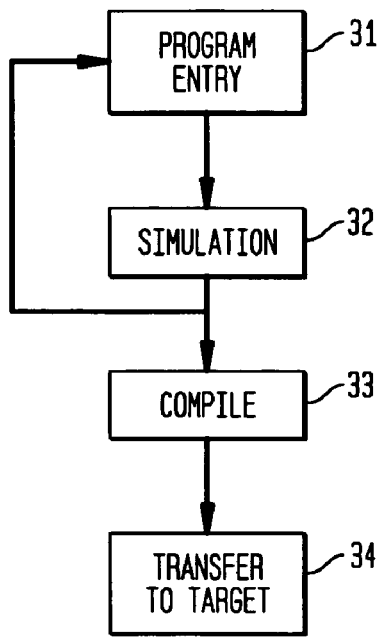
FIG. 3 shows a flow diagram of the conventional method for programming a parallel execution PLC.
Figure 4:
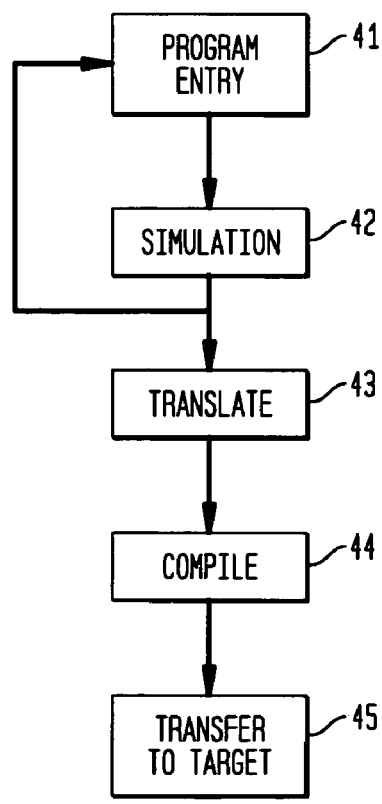
FIG. 4 shows a flow diagram of the method for programming a parallel execution PLC incorporating the invention.

In FIG. 4 a flow diagram shows the method for programming a parallel execution PLC incorporating the invention. In step 41 the user enters the program. For example, the module is programmed utilizing Step 7 (Siemens Energy & Automation) in a manner very similar to programming a CPU. The instruction set for the module is a subset of the instruction set of an S7-300 CPU (also Siemens Energy & Automation) with several additions (different counter types, shift register, pulse generator and others). In step 42, simulation of module programs shall be provided in two ways: CPU simulation and software simulation. Instructions provided will permit the CPU or the software simulator to be used for simulation without modification to the software or the module program. Programs are entered utilizing Step 7. In step 43, the translator converts the entered code into an EDIF netlist. Instructions and other logic will be converted into EDIF library functions. Module configuration (parameterization) information will also be used by the translator to determine the fixed resources to implement within the FPGA. The translator will forward the EDIF netlist to an FPGA compiler. In step 44, the FPGA compiler will generate an FPGA image and return to the translator. The translator interprets the error messages (if any) and return the errors or the FPGA image to the configurator. In step 45 the configurator will encapsulate the FPGA image for downloading. The compiled program will then be downloaded into an micro memory chip (in a PROMMER or within the module via the P-Bus) or to the FPGA directly.

What is claimed is:

1. A system for automatically alleviating processor race conditions, the system comprising:
   a sub-phase clocking mechanism for dividing a circuit clock into a plurality of sub-phases, said sub-phase clocking mechanism adapted for use in a programmable logic controller; and
   a translator for (i) translating programmable logic controller program elements from a coding language into Electronic Design Interchange Format, (ii) classifying each program element according to specified ranges of time required for the program element to perform its tasks, and (iii) assigning program elements within each range for time to a corresponding clock sub-phase.

2. A method for programming a programmable logic controller to avoid race conditions, the method comprising:
   designing logic for the programmable logic controller using a coding language to generate one or more program elements;
   providing a circuit clock divided into a plurality of sub-phases;
   translating the coding language into Electronic Design Interchange Format, said translating including (i) classifying program elements according to specified ranges of time required for each program element to perform its tasks, and (ii) assigning program elements within each range of time to a corresponding clock sub-phase.

3. The system of claim 1, wherein the programmable logic controller program elements are adapted to be translated for use in a field programmable gate array.

4. The system of claim 1, wherein said translator translates the programmable logic controller program elements to hardware elements.

5. The system of claim 1, wherein the plurality of sub-phases comprises twelve sub-phases.

6. The system of claim 1, wherein said translator is in communication with a parallel processor.

7. The system of claim 1, wherein the clocking mechanism comprises RS flip-flops.

8. The system of claim 1, wherein programmable logic controller program elements were ported from a sequential machine.

9. The system of claim 1, wherein the circuit clock is a one micro-second clock.

10. The system of claim 1, wherein said translator utilizes a lock-step technique for strobing circuit elements in the same sub-phase.

11. The system of claim 1, wherein said translator is adapted to convert programmable logic controller program elements into a software embodiment.

12. The system of claim 1, said system is adapted to execute programmable logic controller programs in a parallel method.

13. The method of claim 2, wherein the logic for the programmable logic controller is adapted for implementation in a field programmable gate array.

14. The method of claim 2, wherein said translating the coding language comprises translating a programmable logic controller control program to hardware elements.

15. The method of claim 2, wherein the logic for the programmable logic controller is adapted for use in parallel processing.

16. The method of claim 2, wherein the coding language is adapted for use in a sequential machine.

17. The method of claim 2, further comprising:
   strobing circuit elements in the same sub-phase.

18. The method of claim 2, wherein said translating the coding language is adapted to provide a software embodiment.

19. The method of claim 2, wherein said translating the coding language comprises translating at least one instruction into an Electronic Design Interchange Format library function.

20. A machine-readable medium having stored thereon a plurality of executable instructions, the plurality of instructions comprising instructions for:
   designing logic for the programmable logic controller using a coding language to generate one or more program elements;
   providing a circuit clock divided into a plurality of sub-phases;
   translating the coding language into Electronic Design Interchange Format, said translating including (i) classifying program elements according to specified ranges of time required for each program element to perform its tasks, and (ii) assigning program elements within each range of time to a corresponding clock sub-phase.

* * * * *